Aug. 10, 1954    H. H. HAMLIN ET AL    2,685,952
COIN-CONTROLLED BEVERAGE DISPENSER, INCLUDING
REFRIGERATING APPARATUS
Filed June 16, 1948    7 Sheets-Sheet 1

INVENTORS.
David E. Lawson and
Halley H. Hamlin
BY Dybvig & Dybvig,
Their Attorneys

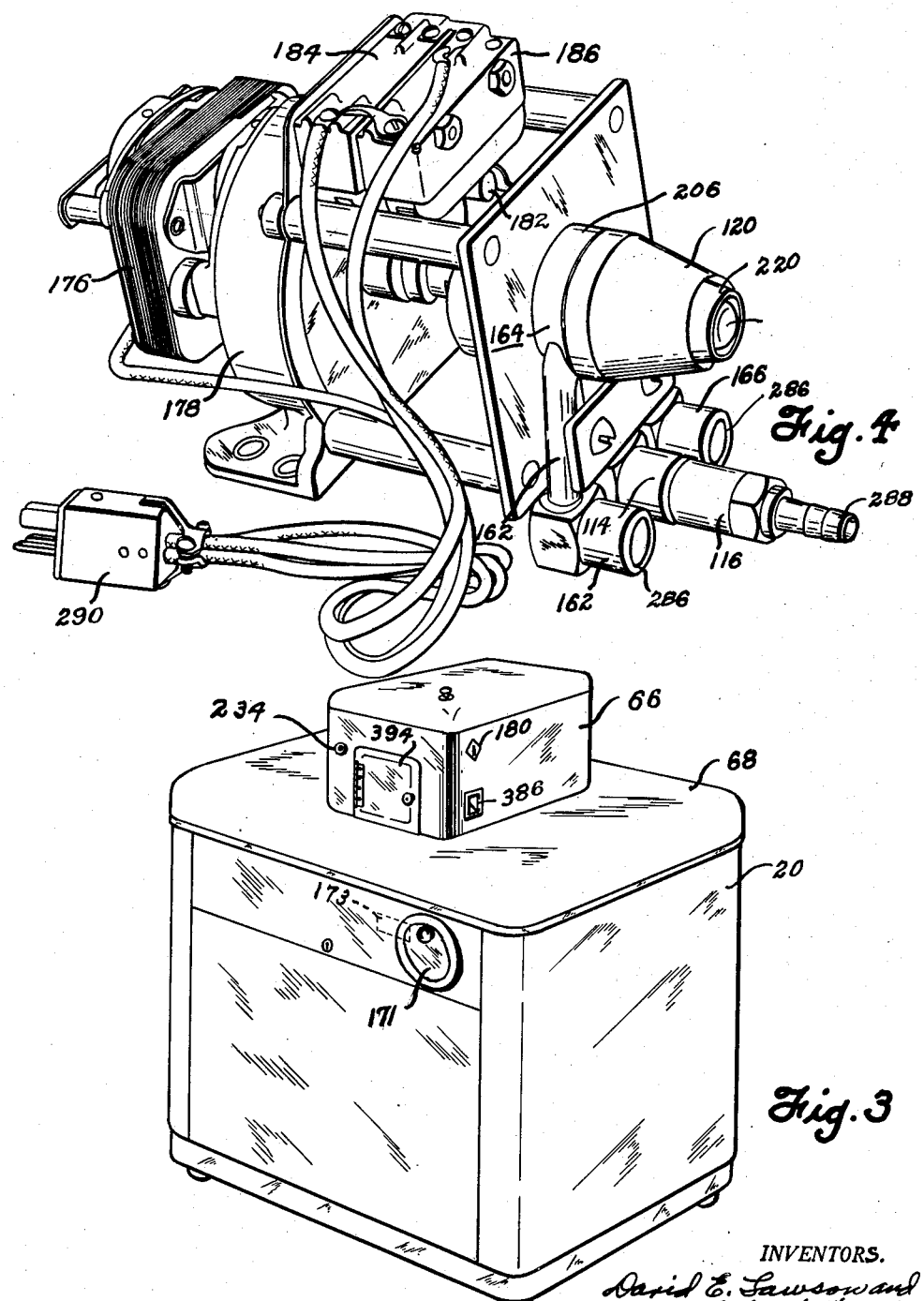

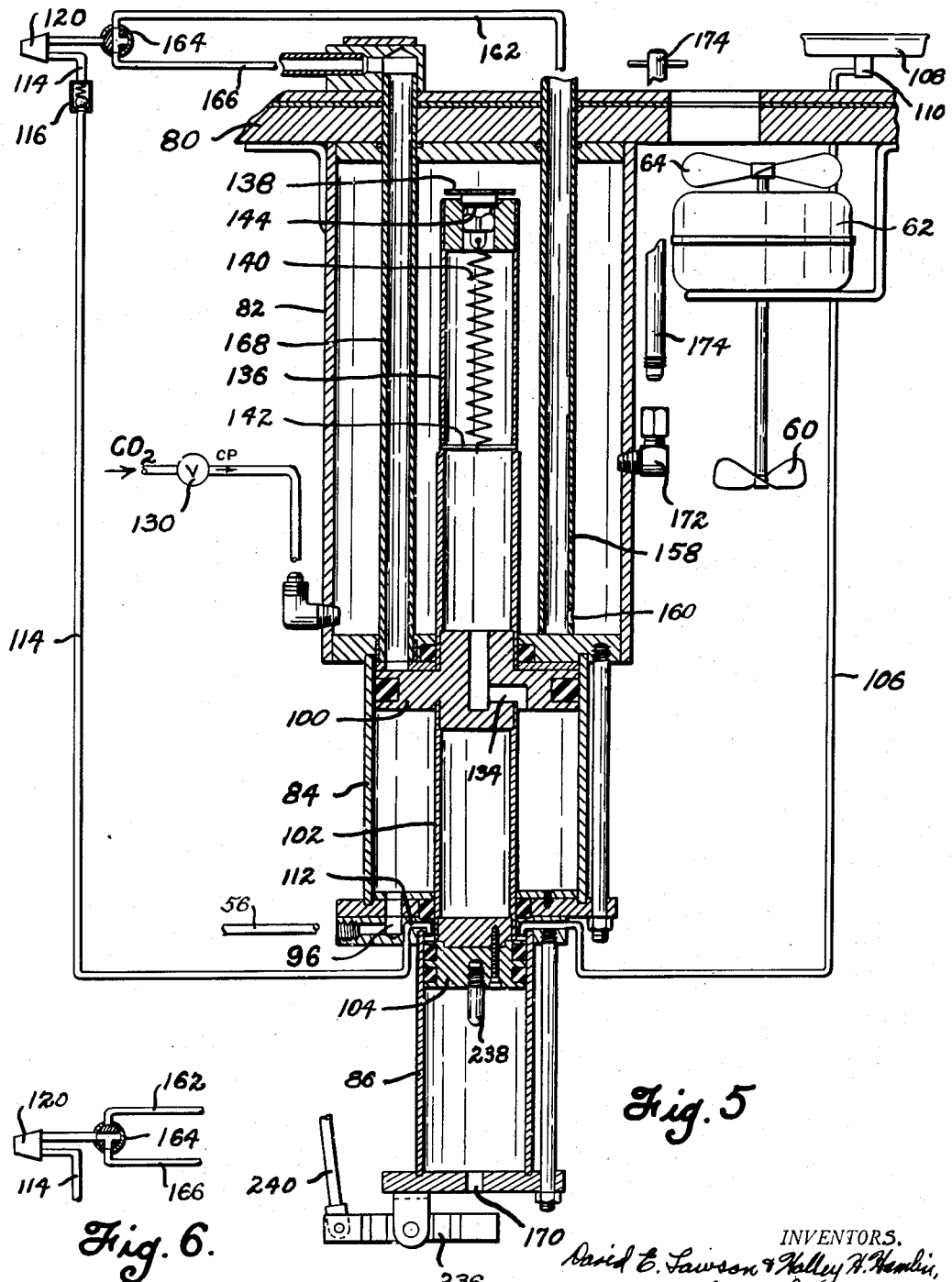

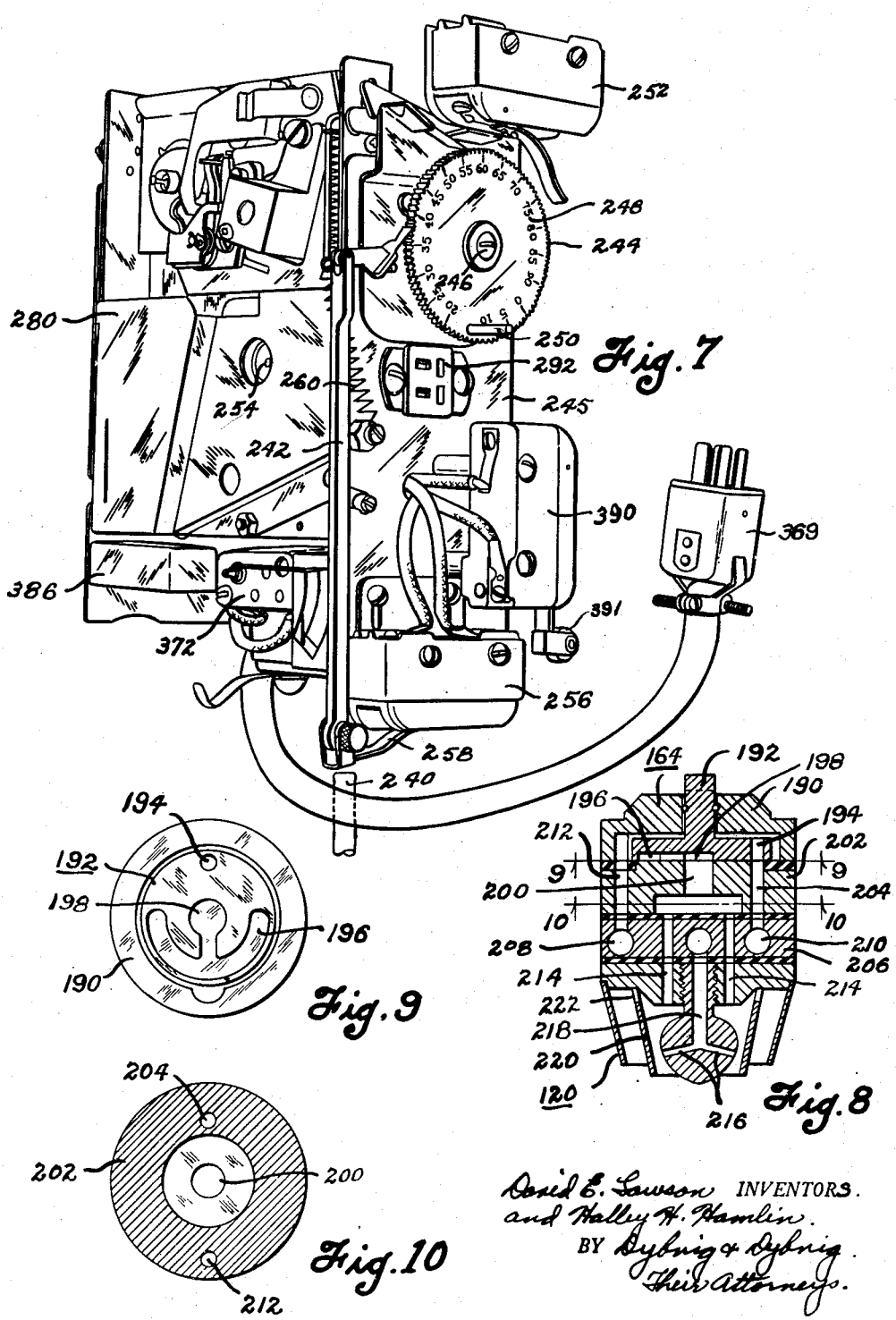

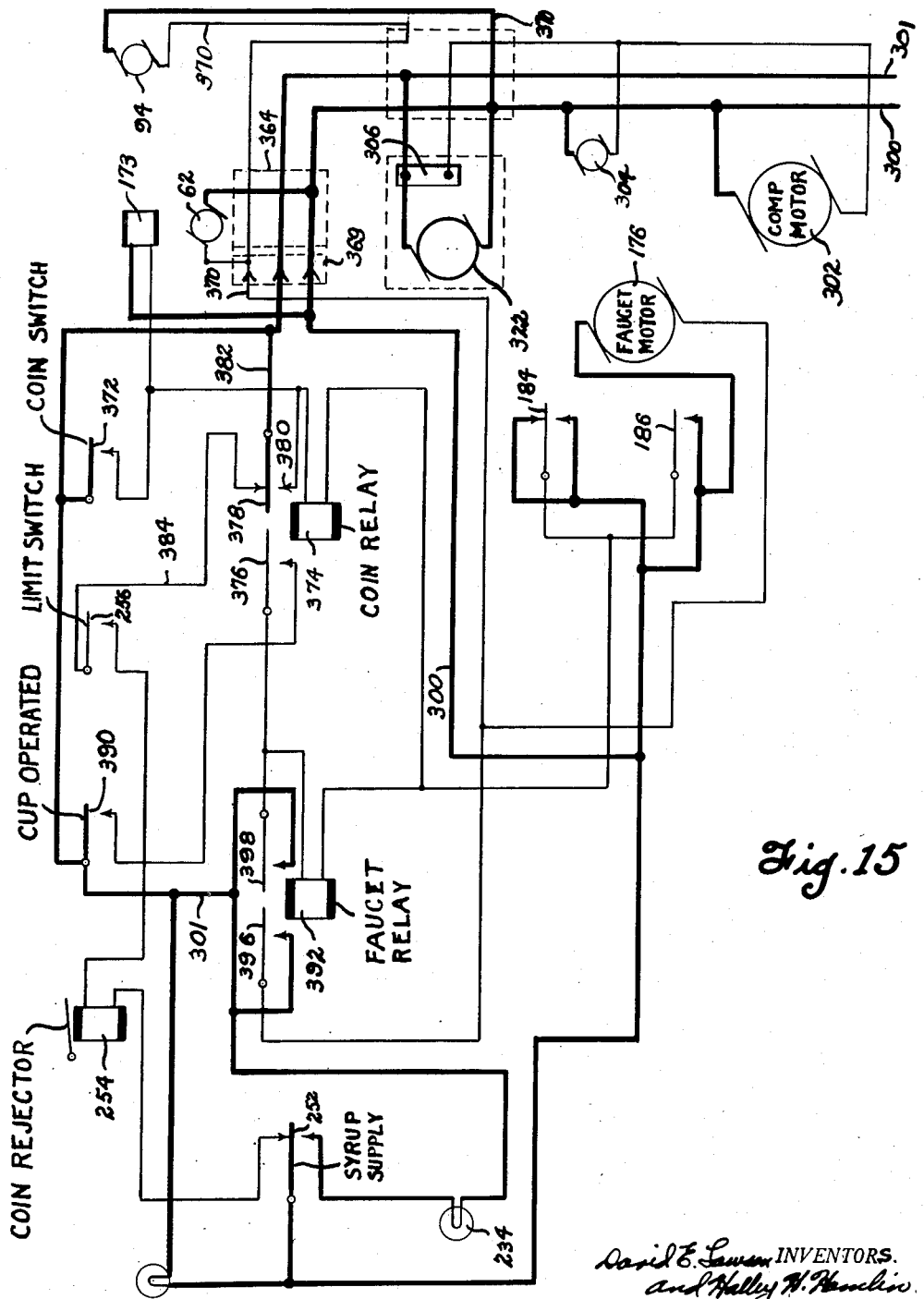

Patented Aug. 10, 1954

2,685,952

UNITED STATES PATENT OFFICE 2,685,952

COIN CONTROLLED BEVERAGE DISPENSER, INCLUDING REFRIGERATING APPARATUS

Halley H. Hamlin, Cortland, N. Y., and David E. Lawson, Cleveland, Ohio, assignors to Hupp Corporation, Cleveland, Ohio, a corporation of Virginia Application June 16, 1948, Serial No. 33,328

19 Claims. (Cl. 194—13)

This invention relates to refrigerating apparatus and more particularly to an improved arrangement for refrigerating and dispensing carbonated beverages.

It is an object of this invention to provide a portable, self-contained unit which is compact and which has adequate capacity for cooling and storing the necessary ingredients for dispensing a large number of cups of a carbonated beverage either in rapid succession or at spaced intervals without any material variation in the quality or temperature of the beverage.

A further object of this invention is to provide an arrangement which makes it possible to use a small and highly efficient refrigerating system for supplying the necessary refrigeration for adequately cooling the beverage even during peak demand periods.

Another object of this invention is to provide a machine which may be manufactured at a low cost and in which the parts are compactly arranged but at the same time readily accessible for servicing or replacement purposes.

Since cold drink vending machines are installed in many establishments such as service stations, recreation establishments and the like where it is important that the machines give continuous service over prolonged periods of time without the necessity of providing the services of a trained operator or repairman, it is important that the apparatus be trouble-free or at least serviceable on the location with a minimum of profitless down-time.

It is an object of this invention to provide a unitized construction of maximum simplicity and requiring a maximum amount of technical skill in the field.

It is another object of this invention to provide an apparatus which is constructed and arranged so as to facilitate the replacement of one or more of the subassemblies or parts without disturbing the adjustment or relationship of the other subassemblies.

Another object of this invention is to provide a portable dispensing machine in which the beverage capacity is limited only by the inventory of syrup, cups and $CO_2$ and in which the supply of syrup, cups and $CO_2$ may be replenished with a minimum of effort and time by unskilled individuals.

Other objects and advantages reside in the construction of parts, the combination thereof and the mode of operation, as will become more apparent from the following description.

In the drawings;

Figure 3 is a perspective view of the main cabinet;

Figure 4 is a perspective view showing the construction of the valve and valve operating mechanism;

Figure 5 is a fragmentary sectional view partly diagrammatic showing the general construction and arrangement of the carbonator and beverage dispensing apparatus;

Figure 6 is a fragmentary diagrammatic view showing the arrangement of the beverage dispensing valve during the beverage dispensing period;

Figure 7 is a perspective view of the subassembly which includes the coin chute and a number of the control switches;

Figure 8 is a sectional view showing somewhat diagrammatically the construction of the valve;

Figure 9 is a view taken on line 9—9 of Figure 8;

Figure 10 is a horizontal sectional view taken on line 10—10 of Figure 8;

Figure 15 is a schematic circuit diagram.

Figure 1:
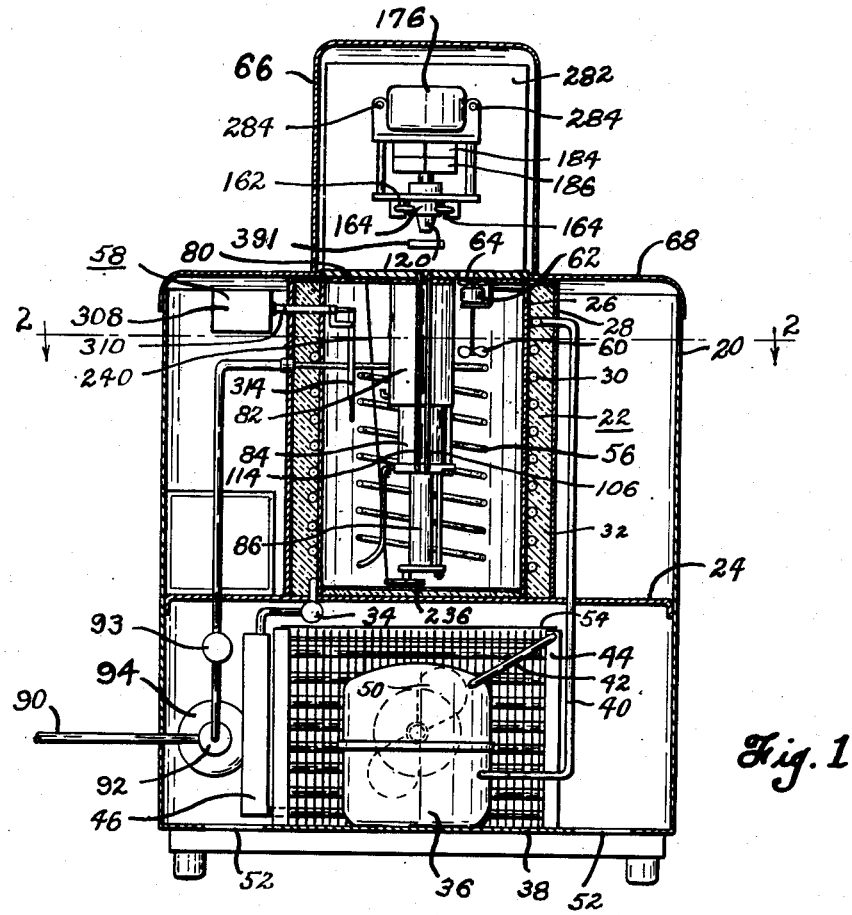
Figure 1 is a vertical sectional view showing the general arrangement of the parts in a preferred embodiment of our invention.

Whereas the apparatus set forth herein is primarily intended for use in preparing, refrigerating and dispensing carbonated types of beverages, it will be understood that certain aspects of the invention are equally applicable to dispensing other types of beverages, and, in fact, certain features of the invention, such as the refrigeration control features, are applicable to systems other than those involving the dispensing of beverages.

Cabinet and refrigerating apparatus

Referring to the drawings wherein we have shown a preferred embodiment of our invention, reference numeral 20 designates a sheet metal cabinet within which there is provided a refrigerated water tank assembly 22 mounted on a horizontally disposed shelf 24 supported from the side walls of the cabinet 20. The water tank assembly 22 consists of an inner cylindrical tank 26 and an outer cylindrical tank 28 spaced from the inner tank 26, as shown. An evaporator coil 30 is wrapped around the inner tank so as to be in direct thermal exchange relationship with the walls of the inner tank. Suitable insulating material 32 is provided between the inner tank and the outer tank so as to maintain the heat leakage into the tank from the outside atmosphere at a minimum.

Refrigerant liquifying means disposed within the lower portion of the cabinet 20 serves to supply liquid refrigerant to the evaporator 30 through a fixed restrictor type of pressure reducing device 34. The refrigerant liquifying apparatus preferably comprises a sealed motor compressor unit 36 which is supported on the bottom wall 38 of the cabinet 20. The low pressure refrigerant vapor leaving the evaporator 30 is supplied to the compressor unit through the suction or return line 40. The compressed refrigerant vapor leaves the compressor unit 36 through the line 42 which conveys the high pressure refrigerant vapor into a conventional condenser 44 which is also located within the lower portion of the cabinet 20, as shown. The liquid refrigerant leaving the condenser 44 flows into the refrigerant receiver 46 from whence the high pressure liquid refrigerant feeds into the evaporator through the pressure reducing device 34. Whereas the device 34 preferably comprises a fixed restrictor type of control, one could use any conventional type of control, such as a thermostatic expansion valve.

For purposes of illustration, we have shown an arrangement in which a motor driven fan 50 has been provided for forcefully circulating air in thermal exchange with the condenser. The condenser cooling air may be introduced into the condenser compartment through any suitably arranged openings, such as the openings 52 provided in the bottom wall 38. Air leaving the condenser may be discharged to the outside through an opening 54 provided in the back or side wall of the cabinet 20. The locations of the openings 52 and 54 may be varied without departing from the spirit of our invention.

The amount of refrigeration required to properly cool the total quantity of beverage dispensed over a long period of time is not very great, but there will be peak demand periods when the machine will be called upon to dispense a large amount of beverage in a short period of time and for that reason it is desirable to provide some means whereby a small capacity refrigerating system can be used to store up refrigeration capacity during the minimum demand periods for use during peak demand periods. By providing a highly efficient low capacity refrigerating system in combination with an efficient and effective refrigerant hold-over system, it is possible to provide adequate and efficient refrigeration for cooling the beverage under all demanded conditions.

In the embodiment shown, hold-over refrigeration capacity is provided to take care of peak demand periods by allowing a portion of the water maintained in the tank 22 to be converted into ice during minimum demand periods. Thus ice is permitted to form on the inner surface of the water tank during off periods and at any time when the refrigeration capacity exceeds the refrigeration demands. With a spacing of approximately 3½″ between the water coil 56 and the surrounding tank wall, it is practical to allow the ice to accumulate on the wall of the tank to a thickness of approximately 1½″.

An ice probing mechanism 58, which will be described more fully hereinafter, serves to periodically probe to find out if the accumulation of ice on the wall of the tank has reached the maximum desired thickness and, if so, serves to shut off the compressor motor so as to discontinue further operation of the refrigerating system until some subsequent probing operation indicates the thickness of the ice has decreased to a point where the refrigerating system should start operating so as to again supply refrigeration. By virtue of such a construction, a considerable amount of refrigeration may be stored during slack periods for use during busy periods.

A water agitator 60 driven by an electric motor 62 has been provided for agitating the water within the water tank. For purposes of illustrating the invention, there is shown an agitator which operates only when a drink is being dispensed, whereas the agitation could be continuous. Since agitation is not particularly necessary when drinks are not being dispensed, the motor 62 has been connected in the circuit so as to operate only when the apparatus is in the process of dispensing a drink. The circuit for controlling the motor 62 will be described more fully hereinafter in connection with the description of the electrical controls.

An air circulating fan 64, driven by the motor 62, may be used to circulate a small quantity of air from the space above the water in the tank 26 into the hood 66. The hood 66 rests on the top wall 68 of the cabinet 20 and serves to house the syrup supply, the coin control mechanism, and the beverage dispensing valve mechanism to be described more fully hereinafter. Thus the single motor 62 serves the dual purpose of agitating the water in the cooling tank and circulating cool air in thermal exchange with the syrup supply and the liquid handling apparatus in the hood 66.

Carbonator and dispensing mechanism

Referring now to Figure 5 of the drawings wherein the carbonator and the beverage dispensing apparatus are shown in section, reference numeral 80 designates a support which is adapted to rest on top of the water tank assembly 22 in a manner to cause the carbonator and its associated parts to project down into the water tank so as to be refrigerated thereby. Reference numeral 82 designates the main carbonator tank or housing and reference numerals 84 and 86 designate respectively the water and syrup measuring cylinders. In most installations the carbonator utilizes ordinary city water which is first carbonated and thereafter mixed with syrup which adds flavor to the carbonated water.

Figure 2:
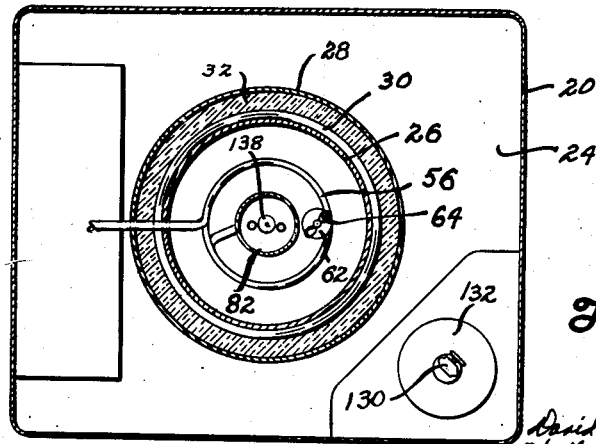
Figure 2 is a horizontal sectional view substantially on line 2—2 of Figure 1.

The carbonator tank 82 is connected to a supply of $CO_2$ gas through a conventional pressure regulating valve and gauge 130 which controls the flow of $CO_2$ gas to the carbonator from the supply tank 132 which may be stored in one corner of the housing 20, as shown in Figure 2. Thus, whenever the pressure within the carbonator falls below the desired pressure, such as 125 lbs., an additional quantity of $CO_2$ gas will feed into the lower portion of the carbonator tank 82.

One of the problems in designing a carbonator is that of providing suitable means for injecting the low pressure water coming from the city mains or any other suitable low pressure water supply into the high pressure carbonator tank. The injection of the uncarbonated water must take place without materially disturbing the degree of carbonation of the carbonated water dispensed by the machine. Furthermore, in dispensing the beverage, it is imperative that the ratio of syrup to carbonated water be maintained constant at all times.

Various arrangements have been devised for injecting the low pressure water into the carbonator and for measuring the desired quantities of water and syrup to be dispensed, but in all the prior art devices it has been necessary to use special injectors or other expensive and troublesome apparatus without always obtaining a drink of uniform composition. By using the apparatus shown in Figure 5, it is possible to maintain a constant supply of properly carbonated water at all times and to utilize the pressure of the carbonated water and gas for injecting the low pressure city water into the high pressure carbonator tank and also use the low pressure of the incoming water for forcing measured quantities of carbonated water and syrup through the beverage dispensing nozzle 120.

As best shown in Figure 1 of the drawings, low pressure water from any suitable source, such as the city mains or the like, is supplied to the device through the water supply line 90 which leads to a booster pump 92 driven by an electric motor 94. The outlet of the pump 92 is connected to the inlet of the water cooling coil 56 disposed within the tank 26. In those localities where one can depend upon an adequate supply of city water at a pressure in excess of 40 lbs. per square inch, the water pump 92 may be eliminated, in which case the incoming water line 90 would be directly connected to the inlet of the water cooling coil 56. A check valve 93 is provided in the water line 90 so as to prevent the reverse flow of water in the line 90 during the injection process.

The outlet of the water cooling coil 56 is connected to the bottom end of the water measuring cylinder 84 (see Figure 5) by means of the water passage 96 which enters the bottom of the water measuring cylinder 84. A water piston or impeller 100 is mounted for reciprocation within the water cylinder 84 and has connected thereto a depending hollow piston rod 102 which is directly connected to a syrup piston or impeller 104 which in turn reciprocates within the syrup cylinder 86 in unison with the water piston 100.

As shown in Figure 5, the construction and arrangement of the pistons 100 and 104 and the parts associated therewith is such that the various exposed areas of the piston subjected to pressure makes it possible to make use of the pressure differences existing within the system to operate the pistons up and down, the arrangement being such that as the pistons move downwardly, measured quantities of carbonated water and syrup are sucked into the measuring chambers 84 and 86 respectively, and as these pistons move upwardly in response to a change in the setting of valve 164, so as to change the balance of pressures acting on the pistons, the measured quantities of carbonated water and syrup are dispensed through the nozzle 120 and into a cup or other container. The pistons 100 and 104 are forced downwardly in response to introduction of high pressure carbonated water into the upper end of the water measuring cylinder and forced upwardly by the low pressure water entering the bottom of the cylinder when the upper end of the measuring cylinder is connected to the dispensing faucet instead of the carbonator tank, as will be explained hereinafter.

A syrup supply line 106 is provided for conveying syrup from the syrup feed device or reservoir 108 into the upper end of the syrup chamber 86. The reservoir 108 is disposed within the hood 66 located on top of the cabinet 20. The syrup feed device 108 includes a check valve 110 (see Figure 11) which allows syrup to flow from 108 through the line 106 into the upper end of the syrup measuring cylinder 86 during the down stroke of the piston 104 but prevents the return flow of syrup during the upward stroke of the piston 104. As the piston 104 moves downwardly, it will cause the space above the piston 104 to be filled with a measured quantity of syrup from the syrup feed device 108, and as the piston 104 moves upwardly, the measured quantity of syrup will be discharged through the outlet passage 112 which connects to the outgoing syrup line 114 in which there is provided a check valve 116 which allows syrup to flow out through the line 118 into the dispensing nozzle 120 but does not allow the return flow of syrup or air. As the syrup measuring cylinder 86 becomes filled with syrup, the upper end of the water measuring cylinder 84 becomes filled with carbonated water whereby subsequent upward movement of the pistons 104 and 100 causes measured quantities of carbonated water and syrup to be dispensed.

Each time a measured quantity of carbonated water is dispensed, a corresponding quantity of relatively low pressure water from the water measuring chamber 84 is injected into the carbonator through the passage 134 provided in the piston 100. The outlet of the passage 134 communicates with the hollow extension 136 provided at the upper end of the piston 100. The extension 136 moves with the piston 100 and includes a poppet valve 138 at its upper end which is normally biased to the closed position by means of a spring 140 which has its bottom end attached to the cross-pin 142 anchored in the side walls of the member 136 and has its upper end attached to the poppet valve 138. A sealing gasket 144 is carried by the poppet valve 138, so as to prevent the leakage of high pressure gas past the valve 138. The gasket 144 may be of any suitable construction, although it is preferred to use an O ring type of gasket.

It will be noted that the upper surface of the poppet valve 138, as well as the upper exposed surface of the member 136, is subjected at all times to a pressure corresponding to the pressure within the carbonator 82 and that this pressure is at all times opposed by the atmospheric pressure acting on the bottom of piston 104 plus the pressure of the water entering the bottom of the cylinder 84. Movement of the pistons is produced by varying the pressure in the upper end of cylinder 84. For this purpose a vertically extending pipe 158 has been provided in the carbonator tank 82 which has an inlet opening 160 adjacent its bottom and which has its upper end connected to a pipe 162 leading to a multiple passage valve 164 diagrammatically shown in Figures 5 and 6. In Figure 5, the valve has been shown in that position in which the high pressure carbonated water coming from the carbonator tank 82 is directed through the valve 164 into line 166 which connects with the vertically extending pipe 168 leading to the upper end of the chamber 84 at a point above the piston 100. With the valve 164 in the position in which it is shown in Figure 5, the high pressure carbonated water acting on the upper exposed surface of the piston 100, combined with the gas pressure acting on the spray head 138 and transmitted by the piston shaft 136, is sufficient to force the pistons 100 and 104 downwardly against any pressures which may be tending to force the pistons upwardly. Because of the check valve 93 in the water line 90, the low pressure water below the piston 100 in the cylinder or chamber 84 has no way of escaping from the cylinder except to be forced upwardly through the passage 134 and out through the poppet valve 138 into the upper end of the carbonator 82.

In view of the above described construction, when the valve 164 occupies the position in which it is shown in Figure 5, the upper exposed surface of the piston 104 is subjected to an almost negligible pressure which is determined by the pressure in the syrup supply line 106 and the upper exposed surface of the piston portion 100 is subjected to the 125 lb. pressure maintained within the carbonator 82. The 125 lb. pressure acting on the exposed upper end of the piston 100 plus the 125 lb. pressure acting on the upper end of the poppet valve assembly 138 is sufficient to overcome the combined pressures tending to force the piston assembly upwardly, with the result that the 40 lb. water in the chamber 84 will be forcefully injected into the carbonator through the poppet valve 138. The construction and arrangement of the poppet valve 138 is such that the injected water is sprayed into the $CO_2$ gas occupying the upper portion of the carbonator 82.

One of the advantages of the carbonator construction shown is that the quantity of carbonated water in the carbonator is substantially constant at all times, since for each cup of carbonated water drawn off, a corresponding amount of make-up water is sprayed into the upper portion of the carbonator chamber 82. Another advantage of the arrangement shown is that the incoming make-up water is refrigerated as it passes through the water cooling coil 56 and before it is mixed with the main carbonated water supply. Furthermore, the carbonator apparatus and its associated parts are all kept chilled by virtue of the fact that they are all submerged in the cold water bath. If at any time a large number of drinks should be served in such rapid succession so that the incoming make-up water being injected into the carbonator would not have time to be fully cooled before entering the carbonator tank 82, the spraying of this water against the refrigerated walls of the carbonator tank 82 would help to further cool the water. A conventional cup dispensing mechanism (not shown) may be provided within the cabinet 20 for dispensing cups out through the small door 171 at the front of the cabinet, as shown in Figure 3. The door 171 is normally held closed by the solenoid 173 which only allows the door to be opened after a coin has been inserted in the slot 180, as will be explained more fully hereinafter. When the door 171 has been unlocked by solenoid 173, a cup may be removed manually to be used, as described below, to contain a beverage dispensed by other elements of the apparatus.

In tracing the path of the water coming from the city mains and finally ending up in a drinking cup, the water first passes through the pump 92 which delivers the water into the water cooling coil 56 from whence the water flows through the passage 96 into the lower side of the piston 100 from whence the water is forced upwardly through the passage 134 and against the valve 138, so as to open this valve. The water is then sprayed into the $CO_2$ gas in the upper portion of the carbonator 82 from whence it enters the aperture 160 adjacent the bottom end of the pipe 158 which conveys the high pressure water to the valve 164 and thence into the line 166, so as to fill the upper end of the measuring cylinder 84 from whence the carbonated water returns through the line 166 to the valve 164 which then directs the water into the nozzle 120 and into the drinking cup.

For purposes of illustration, we have shown a bleeder valve 172 which may be used for bleeding air, $CO_2$ gas or water from the carbonator 82, such as when the apparatus is first placed into operation. The bleeder valve 172 includes an operator 174 which projects above the support 80, as shown in Figure 5. This bleeder valve is located approximately two inches from the bottom of the tank 82 and coincides with the preferred water level within the carbonator 82. It has been found that a carbonator having a diameter of approximately four inches is adequate when constructed as shown, whereby it is apparent that only a small amount of carbonated water is maintained in the carbonator 82 at any time.

The valve 164, which has been diagrammatically shown in Figures 5 and 6, is shown in greater detail in Figures 4, 8, 9 and 10. Referring now to Figure 4 of the drawings, it will be noted that the valve 164 is operated by an electric motor 176 which drives the valve through a gear reduction mechanism 178. The motor 176 is adapted to be energized in response to insertion of a coin in the coin slot 180 and will rotate the valve one complete revolution for each coin properly inserted, as will be explained more fully hereinafter. Suitable cam means 182 is provided on the shaft which connects the gear reduction mechanism 178 and the valve 164 for operating a pair of micro-switches 184 and 186 which are used for controlling the motor circuit and indirectly other portions of the apparatus.

As best shown in Figure 8, the stationary valve housing comprises a series of plate-like members or sections 190, 202, 206 and 207 having suitable fluid passages formed therein. The flow of carbonated water is controlled by the motor operated valve element 192 which is the only movable part of the valve. The syrup enters the valve housing at the central rear portion of the housing element 206 and immediately leaves through the pasages 218 and 216 without contacting the movable portions of the valve. Reference numeral 190 designates that portion of the stationary valve housing within which the rotatable flow directing valve element 192 is mounted. As indicated in Figure 9 of the drawings, the valve element 192 is provided with a first circular passage 194 passing through the horizontally disposed flange portion of the valve. The bottom surface of the element 192 has a cutaway portion 196 which includes a central porton 198 arranged in registry at all times with the carbonated water outlet passage 200 provided in the valve housing section 202. The outer part of the cutaway portion 196 is arranged to register with the passage 204 in the valve housing section 202 throughout approximately one-half of one complete revolution of the valve element 192, so as to direct the incoming high pressure carbonated water into the return line 166. The valve housing section 206 is provided with a first passage 208 which is at all times connected to the high pressure carbonated water feed line 162 and a second passage 210 which is at all times connected to the carbonated water line 166 which conveys carbonated water to the carbonated water measuring chamber 84 during one portion of the cycle of operation and then returns the same carbonated water to the valve during the dispensing portion of the cycle. The passage 208 is also connected to the passage 212 which conveys the high pressure carbonated water coming from the carbonator to the space above the movable valve element 192. In Figure 8, the valve element 192 has been shown arranged so as to direct the high pressure carbonated water down through the passage 194 and into the passages 204 and 210 which connect with the water line 166. Thus Figure 8 shows the valve in the same position in which it is diagrammatically shown in Figure 5 of the drawings.

By rotating the movable valve element 192 so as to move the passage 194 out of registry with the passage 204, the cutaway portion 196 will come into registry with the passage 204, with the result that the carbonated water in the measuring chamber 84 will be free to return to the valve via the pipe 166 to be dispensed. The returning water flows through the passages 210, 204, the cutaway portions 196 and 198, the passage 209 and then out through the passages 214 which cause the carbonated water to be discharged through the dispensing nozzle generally designated by the reference character 120. The carbonated water will continue to flow out through the above-mentioned passages throughout approximately a full one-half revolution of the valve element 192, after which the flow path will be interrupted for approximately a quarter of a turn until the port 194 returns into registry with the passage 204.

It will be noted that the syrup is mixed with the carbonated water at the very outlet of the nozzle 120. A baffle 220 has been provided in the nozzle, so as to improve the flow characteristics of the nozzle. This baffle 220 is provided with a series of passages 222 adjacent its upper end through which $CO_2$ gas and/or carbonated water is free to pass from the interior of the baffle 220 to the space between the baffle 220 and the surrounding shroud or nozzle proper 120.

Syrup feed mechanism

Figure 11:
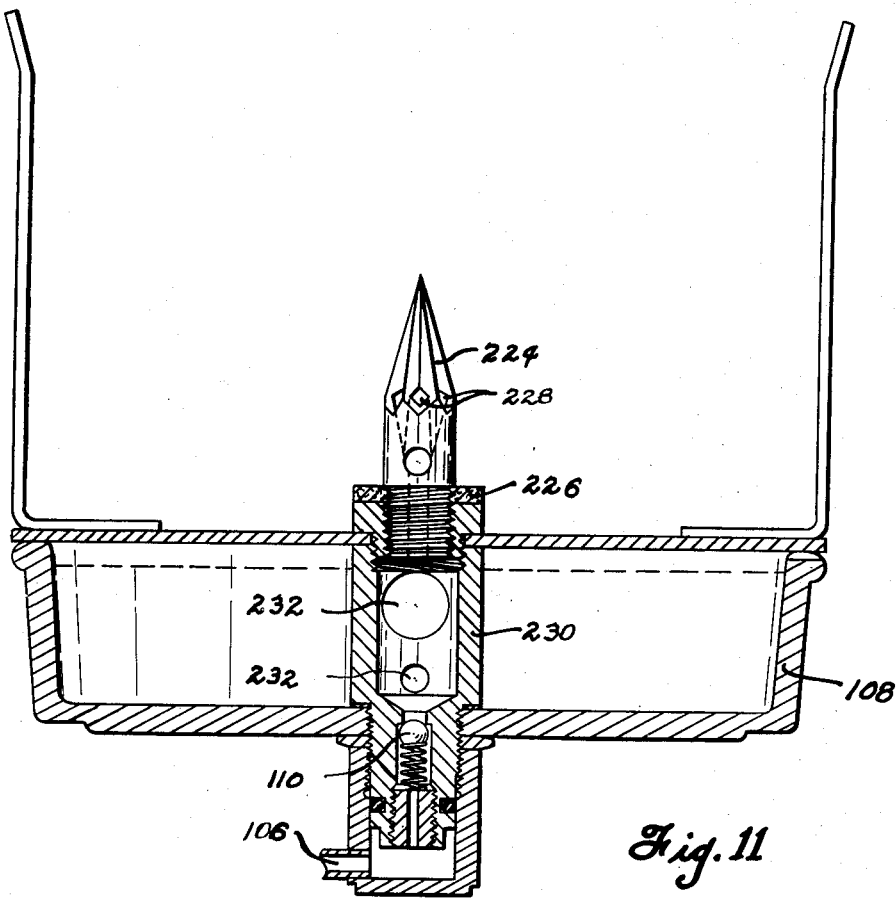
Figure 11 is a fragmentary sectional view showing the can piercing mechanism and the syrup feed assembly.
Figure 14:
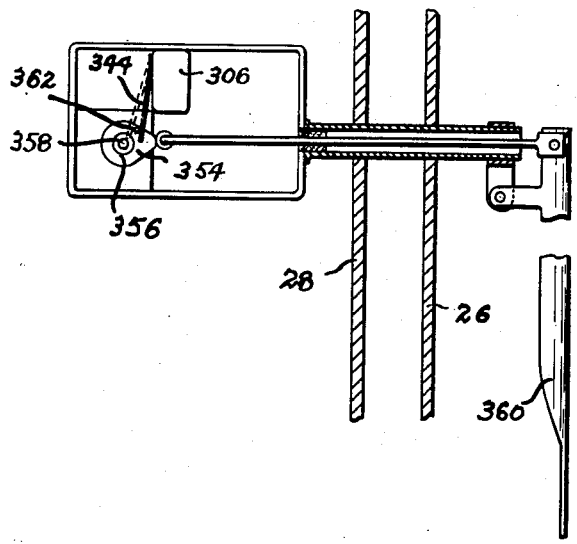
Figure 14 is a view somewhat similar to Figure 12 but showing an alternative form of ice probing mechanism which may be substituted for the mechanism shown in Figures 12 and 13.

The syrup used in making the beverage comes in tin cans (not shown) which are adapted to have a hole pierced in the bottom thereof by means of the can piercing device 224 which projects upwardly from the syrup feed reservoir 108. Gasket means 226 is arranged to engage the bottom wall of the syrup can, so as to prevent leakage of the syrup after the can has been pierced. A plurality of syrup feed apertures 228 are provided in the syrup can piercing device 224 for feeding the syrup downwardly into the syrup feed receptacle 108. A central syrup feed member 230 has been provided which incorporates the check valve 110 and includes a plurality of side apertures 232 which communicate with the syrup in the syrup reservoir or chamber 108, as shown in Figure 11. The arrangement of the openings 232 and the openings 228 is such that syrup will drain from the can into the receptacle 108 to a level approximately corresponding to the upper edge of the side openings 232. As syrup is withdrawn from the reservoir 108 by the dispensing apparatus, the syrup level in the reservoir drops below the upper portions of the openings 232, with the result that air is allowed to enter the openings 232 and find its way into the syrup can, so as to allow a corresponding amount of syrup to drain from the can into the reservoir. When the openings 232 become submerged, the flow of air to the syrup can stops and this stops further flow of syrup from the can into the receptacle 108.

A drink counter and signal mechanism has been provided for counting the number of drinks dispensed by the apparatus and for energizing the light 234 (located on the front panel of the hood 66, as shown in Figure 3) when the syrup can needs replacement. The counter mechanism includes a rotatable disc 224 (see Figure 7) operated by the pawl mechanism 242 which reciprocates in response to movement of the water and syrup measuring pistons 100 and 104.

Referring now to Figures 1, 5 and 7, it will be observed that a pivoted lever 236 is pivotally supported adjacent the bottom end of the syrup measuring cylinder 86 and is adapted to be operated by the downwardly projecting pin carried by the piston 104. Thus, each time the piston 104 moves downwardly in the process of dispensing a drink, the pin 238 will engage the one end of the lever 236, so as to push upwardly on the counter actuating rod 240 which has its upper end arranged as shown in Figure 7 to reciprocate the pawl mechanism 242.

The upper end of the mechanism 242 is provided with a projecting finger or pawl, as shown, which engages the teeth or notches provided on the periphery of the disc 244. The disc 244 is rotatably supported on the electric subassembly frame 245 by means of a screw or pivot 246. The arrangement is such that the disc 244 is stepped around one notch for each drink dispensed. Suitable calibrations 248 are provided on the disc 244, so as to indicate at any time the number of drinks which may still be dispensed from a given syrup can before it is necessary to replace the can.

A switch operating pin 250 is carried by the disc 244 and is adapted to engage the actuator for the switch 252, so as to close the circuit to the signal light 234 and so as to open the circuit to the coin rejector solenoid 254 (see Figure 15) which forms a part of the coin chute mechanism. Thus, when the syrup can needs replacement, the solenoid 254 serves to reject any coins which may be inserted in the machine after the syrup supply has been exhausted and before a new can of syrup has been inserted. When a new can of syrup is mounted in place, the operator resets the counter mechanism, so as to turn off the signal light 234 and reestablish the circuit leading to the one lead of the coin rejector solenoid 254.

Reciprocation of the rod 240 in response to downward movement of the piston 104 also serves to close the switch 256 which is arranged in series with the coin rejector solenoid 254, as shown in Figure 15, so as to prevent the acceptance of coins when the dispenser is in the process of dispensing a drink. It will be noted that the ratchet mechanism 242 is pivotally supported on the operator 258 for the switch 256 and has its upper end or ratchet end biased into engagement with the notches on the disc 244 by the coil spring 260 which has its one end secured to the upper end of the ratchet mechanism 242 and has its other end anchored to the frame 245.

Referring now to Figure 7 of the drawings wherein we have shown a conventional coin chute, the construction of which forms no part of this invention except for its relationship to the electrical controls shown in Figure 15, it will be noted that the chute is supported on the subassembly frame 245, which in turn is removably supported on the back side of the upwardly extending panel 282 (see Figure 1) which also serves to support the dispensing valve 164 and the valve operating motor 176. By mounting all of the essential parts of the electrical control system on the subassembly frame 245, the problem of replacing the electrical controls in the event of any malfunction is greatly simplified. The main dispensing valve and valve operating mechanism of Figure 4 constitutes another subassembly which is likewise readily removable as a unit merely by removing the screws 284 (see Figure 1) and then lifting the valve operating mechanism as a unit. The valve subassembly includes the quickly detachable type of fluid connections 286 and 288 which are of conventional design and removably fit onto the carbonated water and syrup lines in order to facilitate the quick and easy removal of the dispensing valve subassembly. It will also be noted that the electrical connections to the motor and the switches forming a part of the valve subassembly terminate in a plug 290 which is adapted to be plugged into the socket 292 on the electrical subassembly mounted immediately to the rear of the valve subassembly. The electrical subassembly is provided with a flexible cord terminating in a plug 369 which connects the electrical subassembly to a junction box 354 (see Figure 15) which may be located in any convenient location within the main cabinet 20.

*Ice probing mechanism*

Referring now to Figure 15 wherein the electrical circuit has been shown, reference numerals 300 and 301 designate the main power lines which are used in supplying power (preferably alternating current at 110 volts) for operating the various controls. Reference numerals 302 and 304 designate the compressor motor and condenser fan motor respectively of the refrigerating system. These motors are controlled by the switch 306 shown in Figures 1, 12 and 13. The switch 306 is operated by an ice probing mechanism which comprises a main support or housing 308 which is secured to a hollow supporting member 310 which projects through the wall of the main water tank. The member 310 slidably supports a slide member 312 which is pivotally connected at its outer end to an ice prober 314 which projects down into the water bath between the water coil 56 and the wall of the water tank 26. The ice prober is pivoted at 316 on a bracket 317 carried by the member 310. The inner end of the reciprocating rod 312 is connected to a relatively weak coil spring 318 which has its one end anchored to a stationary pin 320 carried by the housing 308. A continuously running motor or clock mechanism 322 is carried by the housing 308 and causes continuous rotation of a cam finger 324 which is adapted to be driven at a rate of one revolution per hour. This cam is arranged to periodically engage the lever 326 which has its upper end pivotally secured to the reciprocating rod element 312 at 328. The lower end of the lever 326 is pivotally carried by a pin 330 which in turn is carried by the upper end of the lever 332 mounted to pivot about the stationary pin 334 fixed to the housing 308. A relatively strong spring 336, having its one end anchored to the stationary pin 338 and having its other end secured to the pivot pin 330, normally holds the lever 332 at rest against the stationary stop 340 fixed to the housing 308. By virtue of this arrangement, as the cam 324 rotates into engagement with the upper end of the lever 326, the lower end of the lever 326 normally remains stationary and the upper end serves to push the rod 312 inwardly, with the result that the lower end of the ice prober 314 moves toward the wall of the water tank. However, if the amount of ice on the wall of the water tank exceeds a predetermined thickness, such as 1½", so as to interfere with pivotal movement of the ice prober 314, the upper end of the lever 326 will thus be prevented from moving, with the result that the lower end of the lever 326, together with the upper end of lever 332, will move and will cause the adjustable switch operating member 342 carried thereby to move to the right, as viewed in Figure 13, so as to engage the switch operator 344 which then opens the circuit to the compressor motor 302 and the condenser fan motor 304.

A pivoted latch 346 will serve to hold the switch operating lever 344 in the circuit breaking position even after the cam 324 moves out of engagement with the lever 326 and after the switch operating member 342 moves away from the member 344. The compressor motor thus remains de-energized continuously until the latch 346 disengages the operator 344 in response to movement of the latch releasing member 348 to the right a distance sufficient to release the latch during a subsequent ice probing operation after the thickness of ice on the receptacle indicates the desirability of again supplying refrigeration. However, so long as an adequate ice coating remains on the wall of the tank, the rod 312 will be prevented from reciprocating far enough to move the latch out of latching position. A spring 350 normally biases the latch into latching position and a stationary stop 351 limits the movement of the upper end of the lever 326 to the left, as viewed in Figure 13.

Figure 12:
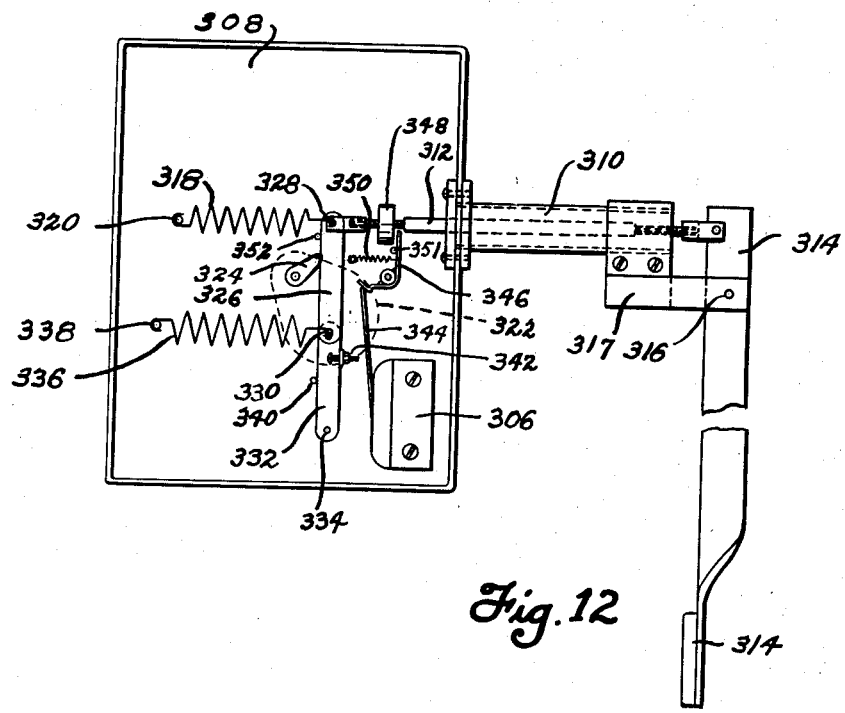
Figure 12 is a fragmentary sectional view showing a preferred form of ice probing mechanism.
Figure 13:
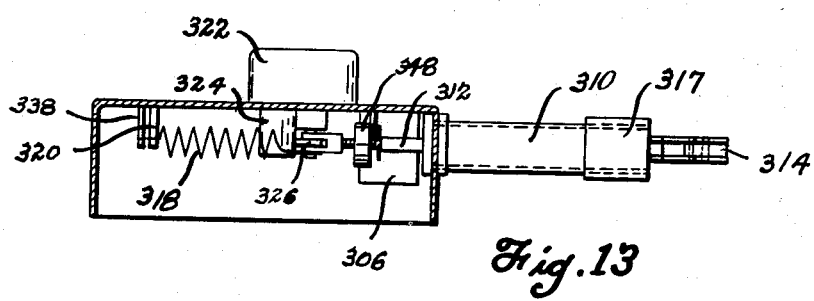
Figure 13 is a plan view of the ice probing mechanism shown in Figure 12.

In Figure 12 of the drawings, we have shown an alternative type of ice probing mechanism which also includes an ice probe operating cam 354 which is driven by a continuously rotating motor shaft 358 through a slip connection 356 arranged between the motor shaft 358 and the cam 354, so that if the ice prober 360 is stopped in its movement by an excessive accumulation of ice, the cam 354 will slip relative to the shaft 358 and will be prevented from completing its revolution until enough ice has melted to allow the prober to move, so as to permit the cam to continue in its operation. The motor circuit is controlled by the pin 362 which, in the absence of an excess accumulation of ice, momentarily opens the circuit to the compressor motor once during each revolution of the cam for a period corresponding to the time required for the pin 362 to clear the switch operator 344. However, if the accumulation of ice prevents the free rotation of the cam 354, the switch 306 will be held closed for a period of time corresponding to the length of time required for the ice on the wall of the water tank to melt sufficiently to allow the cam to continue in its movement.

Electrical circuit

Again referring to the circuit diagram shown in Figure 15 of the drawings, reference numerals 364 and 369 designate a junction box and plug respectively which serve to connect the electrical apparatus carried by the subassembly 245 shown in Figure 7 to the main power lines and the rest of the electrical circuit. The main power lines have been shown in heavy lines, so as to distinguish the wires which are alive at all times from those which are alive only at certtain times. It will be noted that in addition to the main power lines 300 and 301, there is provided a third line 370 leading to the water pump motor 94, the agitator motor 62 and the faucet or valve motor 176. Current will flow through the line 370 only at such times when a coin has been inserted into the coin chute so as to initiate operation of the drink dispensing mechanism by setting up the various control relays, as will now be explained. Insertion of a coin in the coin chute closes the switch 372 which then closes the circuit from the power line 301 through the coin relay 374, the switch 184, and then to the other power line 300. Energization of the relay 374 moves the contactors 376 and 378 down. Downward movement of the contactor 378 closes the circuit through the contact 380, so as to directly energize the coin relay 374 through the holding circuit which includes the branch conductor 382. Downward movement of the contactor 378 breaks the circuit to the conductor 384 which is arranged in circuit with the piston operated limit switch 256 and the coin rejecter 254, so as to maintain the coin rejecter 254 deenergized whereby to prevent the acceptance of a coin which may be inserted in the coin slot before the dispenser has finished dispensing another drink. The switch 256 is biased open but is held closed until the piston 104 moves upwardly to discharge a drink. The rejected coins are returned through a conventional coin return chute 386 (see Figures 3 and 7). Downward movement of the contactor 376 places the cup operated switch 390 in series circuit relationship between the power line 368 and the faucet relay 392, so that when a cup, which has been removed following unlocking of the door 171 by operation of solenoid 173, is inserted through the access door 334 (see Figure 3) and the cup is shoved against the switch operating member 391, so as to close the switch 390, the solenoid 392 becomes energized so as to move the contactors 396 and 398 downwardly into their circuit closing positions. Closing of the switch at 396 closes the circuit from the power line 301 to the faucet motor 176, the agitator motor 62, and the water pump 94 through one or the other of the switches 184 and 186 which hold the circuit closed until the faucet motor has made one revolution, at which time the circuit is broken. The switch 184 is held closed at all times except when the faucet motor is operating, whereas switch 186 is normally open but is held closed from the beginning of the dispensing cycle when switch contactor 184 moves from the up position to the down position but does not keep the circuit closed when the contactor of switch 184 moves up at the end of the dispensing cycle.

By virtue of the above described circuit arrangement and sequence of operation of the various switches, when a coin is inserted, the faucet motor is energized and while the faucet or valve element 192 makes one revolution, the pistons 100 and 104 dispense measured quantities of carbonated water and syrup, inject low pressure water into the high pressure carbonator tank and refill the cylinders 82 and 84 with measured quantities of carbonated water and syrup to be dispensed upon insertion of a subsequent coin.

It will be observed that the dispensing apparatus shown is not only entirely automatic in its operation, but uses the energy of the incoming low pressure water and the energy of the relatively high pressure carbonated water being dispensed for operating the pistons or impellers. Also it will be noted that the valve mechanism is employed only for controlling the flow of the carbonated water, the syrup being discharged directly through the central port 218 of the discharge nozzle and thus avoiding any corrosive or gumming action on the valve faces.

While the apparatus, as shown and described, includes a fully automatic coin operated machine, it is apparent that certain features of the invention may be used in a manually operated machine, in which case the main dispensing valve could be manually operated so as to produce the desired automatic operation of the pistons 100 and 104, so as to cause these pistons to measure predetermined quantities of syrup and carbonated water, dispense these measured quantities, and inject low pressure water into the carbonator. For purposes of illustration, the pistons 100 and 104 have been shown arranged in vertical alignment, whereas these could be arranged differently, such as side by side. Likewise, reciprocating pistons have been shown, whereas other types of pistons or impellers could be used. Thus the pumping action could be performed by rotary pumps or the like in so far as certain features of the invention are concerned.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. In a refrigerator for use in cooling the ingredients for carbonated beverages, a cabinet having a top opening, a water tank disposed within said cabinet and having a top opening in alignment with said first named top opening, means for storing ingredients for a carbonated beverage within said water tank, a refrigerating system including an evaporator arranged in thermal exchange relationship to the wall of said tank for cooling the contents of said tank, said refrigerating system including a fixed restrictor for controlling the flow of refrigerant to said evaporator, means responsive to the accumulation of a predetermined quantity of ice within said water tank for controlling the operation of said refrigerating system, means for agitating the water within said tank, means for dispensing controlled quantities of said ingredients, and control means for energizing said agitator means during operation of said dispensing means.

2. In a refrigerator for use in cooling a beverage, a cabinet, a tank disposed within said cabinet and adapted to contain a body of heat transfer liquid, a heat exchange unit disposed within said tank in spaced relationship to the walls of said tank so as to be cooled by said liquid, a refrigerating system including means for evaporating a volatile refrigerant in thermal exchange relationship with the walls of said tank so as to cool said liquid so as to congeal a portion of said liquid adjacent the walls of said tank, means responsive to an accumulation of a predetermined quantity of said congealed liquid on the walls of said tank for stopping the operation of said refrigerating system, means for intermittently flowing an ingredient for said beverage through said heat exchange unit, means for agitating said heat transfer liquid, and means operable only when the ingredient for the beverage flows through said heat exchange unit for controlling the operation of said agitating means.

3. In a refrigerator, an outer cabinet, a tank disposed within said outer cabinet adapted to contain a body of liquid, a volatile refrigerant evaporator disposed in thermal exchange relationship with the walls of said tank, a heat exchange unit at least partially submerged within the liquid in said tank, said heat exchange unit being spaced from the walls of said tank, means for supplying a volatile refrigerant to said evaporator, said refrigerator being characterized by means responsive to a predetermined accumulation of congealed liquid on the inner wall of said tank for controlling the supply of refrigerant to said evaporator, a storage receptacle disposed within said tank and having an inlet connected to the outlet of said heat exchange unit and having an outlet including a valve for controlling the flow through said heat exchange unit, and means for agitating said liquid within said tank only when said valve opens.

4. Refrigerating apparatus comprising in combination, a cabinet, said cabinet having side, bottom and top walls, said top wall having an aperture therein, a water tank disposed beneath said aperture, refrigerating apparatus including an evaporator arranged in thermal exchange relationship with the water in said water tank, beverage storing and dispensing mechanism, means for removably supporting said mechanism on the top wall of said cabinet with a first portion of said mechanism projecting downwardly into said water tank and a second portion of said mechanism projecting above said top wall, said second portion including a motorized valve and a dispensing nozzle, said apparatus being characterized by means for agitating said water, coin chute means, and means operable in response to insertion of a coin in said coin chute for momentarily energizing said motorized valve and said agitating means.

5. Refrigerating apparatus comprising in combination; a cabinet having side, bottom and top walls; said top wall having an aperture therein; a water tank disposed beneath said aperture; refrigerating apparatus including an evaporator arranged in thermal exchange relationship with the water in said water tank; beverage storing and dispensing mechanism; means for removably supporting said mechanism on the top wall of said cabinet with a first portion of said mechanism projecting downwardly into said water tank and a second portion of said mechanism projecting above said top wall; said second portion including a valve and a dispensing nozzle; coin chute means; said apparatus being characterized by means operable in response to insertion of a coin in said coin chute for energizing said valve; and means responsive to insertion of a coin in said coin chute for agitating water in said tank.

6. In a beverage cooling and dispensing system, a cabinet, a cooling tank within said cabinet, refrigerating apparatus including an evaporator arranged in thermal exchange relationship with said tank, a beverage storing and dispensing mechanism having at least a portion thereof arranged within said tank, said beverage storing and dispensing mechanism including a dispensing valve for dispensing given quantities of a beverage, means for dispensing cups, coin controlled means for controlling the operation of said valve and said cup dispensing means, said dispensing system being characterized by means operable in response to a predetermined number of operations of said dispensing means for causing said coin controlled means to reject additional coins.

7. In a beverage cooling and dispensing system, a cabinet, a cooling tank within said cabinet, refrigerating apparatus including an evaporator arranged in thermal exchange relationship with water in said tank, a beverage storing and dispensing mechanism having at least a portion thereof arranged in thermal exchange relationship with water in said tank, said beverage storing and dispensing mechanism including a dispensing valve for dispensing given quantities of a beverage, said dispensing system being characterized by coin controlled means for controlling the operation of said valve, means operable in response to insertion of a coin in said coin controlled means for agitating the water in said water tank, and means operable in response to a predetermined number of operations of said valve for causing said coin controlled means to reject subsequently inserted coins.

8. In a beverage dispensing mechanism, a support, a carbonator mounted on said support, a syrup container, means for removably supporting said syrup container on said support, beverage measuring and dispensing mechanism, said beverage measuring and dispensing mechanism including a motorized valve unit, means for removably supporting said motorized valve unit on said support, means for controlling the operation of said motorized valve unit including a control panel, means for removably supporting said control panel on said support, said control panel including a quickly detachable coin chute unit, a cabinet, a water tank within said cabinet, refrigerating apparatus including an evaporator arranged in thermal exchange relationship with water in said tank, said cabinet having an opening in its top wall arranged in alignment with said water tank, and means for removably mounting said support adjacent said opening with the carbonator projecting into said tank.

9. In a beverage dispensing mechanism, a support, a carbonator mounted on said support, a syrup container, means for removably supporting said syrup container on said support, beverage measuring and dispensing mechanism, said beverage measuring and dispensing mechanism including a motorized valve unit, a cabinet, a water tank within said cabinet, refrigerating apparatus including an evaporator arranged in thermal exchange relationship with water in said tank, said cabinet having an opening in its top wall arranged in alignment with said water tank, means for removably mounting said support adjacent said opening with the carbonator projecting into said tank, said dispensing mechanism being characterized by means carried by said support and extending downwardly into the water in said tank for agitating the water in said tank, fan means for circulating air in thermal exchange with said syrup container, and a common motor for operating said agitator and said fan means.

10. In combination, a beverage storing and dispensing apparatus including a motorized dispensing valve, control means for said valve including a coin chute having means for selectively accepting or rejecting coins inserted therein and including means for rejecting coins inserted into said coin chute while said dispensing mechanism is in the process of dispensing a drink, means for refrigerating said liquid storing and dispensing apparatus including a refrigerated water tank, means for agitating the water in said water tank, said dispensing apparatus being characterized by means for cycling said agitating means in unison with the operation of said dispensing valve.

11. In combination, a cabinet, a refrigerating system including an evaporator disposed within said cabinet, beverage storing and dispensing mechanism removably supported on said cabinet in thermal exchange relationship with said evaporator, said beverage storing and dispensing mechanism comprising a plurality of self-contained units, one of said units comprising a motorized dispensing valve, a second of said units comprising an electrical control panel including a coin chute and counting mechanism for counting the number of drinks dispensed.

12. In combination, a cabinet having side, top and bottom walls, a first opening in the top wall of said cabinet, a carbonator projecting downwardly into said cabinet through said opening and removably supported by said cabinet, a water tank disposed within said cabinet so as to surround at least a portion of said carbonator, a self-contained refrigeration system disposed within said cabinet externally of said water tank and including an evaporator in thermal exchange relationship with the wall of said water tank, an agitator disposed within said tank for agitating the water therein, means for dispensing carbonated water from said carbonator including a valve, means for energizing said agitator, coin controlled means for controlling the operating of said valve, and means operable in response to insertion of a coin for rendering said coin controlled means ineffective to operate said valve in response to insertion of a subsequent coin, said last named means including means for giving a visual indication after said valve has been opened a predetermined number of times.

13. In combination, a beverage storing and dispensing mechanism, a cooling tank adapted to contain a liquid within which a portion of said mechanism projects, a refrigerant evaporator surrounding said tank and arranged in thermal exchange relationship with the wall of said tank, refrigerant liquifying means, fluid flow connections between said refrigerant liquifying means and said evaporator including a fixed restrictor for reducing the pressure of the liquid refrigerant flowing to said evaporator, said dispensing mechanism being characterized by means for controlling the operation of said refrigerant liquifying means in response to a change in the thickness of ice on the wall of said cooling tank, said last named means comprising a continuously running motor, an ice probing member, cam means operated by said motor for periodically urging said ice probing member toward said ice, and switch means operable to prevent operation of said refrigerant liquifying means in response to the accumulation of a predetermined thickness of ice on said tank wall.

14. In combination, a beverage storing and dispensing mechanism, a cooling tank adapted to contain a liquid within which a portion of said mechanism projects, a refrigerant evaporator arranged in thermal exchange relationship with the wall of said tank, refrigerant liquifying means, fluid flow connections between said refrigerant liquifying means and said evaporator including means for reducing the pressure of the liquid refrigerant flowing to said evaporator, said dispensing mechanism being characterized by means for controlling the operation of refrigerant liquifying means in response to the accumulation of a predetermined quantity of ice on the wall of said cooling tank, said last named means comprising a motor adapted to be operated continuously, an ice probing member, cam means operated by said motor through a friction clutch which permits relative rotation between said cam means and said motor when the accumulation of ice prevents further movement of said ice probing member, and switch means operated by said cam for stopping the operation of said refrigerant liquifying means in one position of said cam.

15. In combination, a beverage storing and dispensing mechanism, a cooling tank adapted to contain a liquid within which a portion of said mechanism projects, a refrigerant evaporator arranged in thermal exchange relationship with the wall of said tank, refrigerant liquifying means, fluid flow connections between said refrigerant liquifying means and said evaporator including a fixed restrictor for controlling the flow of liquid refrigerant to said evaporator, said dispensing mechanism being characterized by means for controlling the operation of refrigerant liquifying means in response to the accumulation of a predetermined quantity of ice on the wall of said cooling tank, said last named means comprising a continuously operating motor, an ice probing member, cam means operated by said motor, lever means drivingly connecting said ice probing member and said cam means, and a switch arranged to be operated by said lever means in response to obstruction to movement of said ice probing member by excessive ice on said tank wall.

16. In a refrigerating system, an evaporator, a condenser, a compressor, refrigerant flow connections between said evaporator, compressor and condenser including a fixed restrictor, a motor for operating said compressor, switch means for starting and stopping said motor, said refrigerating system being characterized by means responsive to the accumulation of a predetermined thickness of ice on said evaporator for operating said switch, said last named means comprising a support, a first lever pivoted to said support, a second lever pivoted to said first lever, a reciprocating rod having one end thereof connected to said second lever, an ice probing lever pivotally mounted on said support and having one end connected to said second lever so as to be actuated thereby, cam means carried by said support and arranged to periodically actuate said second lever, means carried by said first lever for operating said switch, and spring means arranged to normally hold said first lever stationary when said cam means actuates said second lever, said spring means being arranged to yield when said ice probing lever restricts movement of said second lever so as to cause said first lever to operate said switch to motor stopping position.

17. In a refrigerating system, an evaporator, a condenser, a compressor, refrigerant flow connections between said evaporator, compressor and condenser including a fixed restrictor, a motor for operating said compressor, switch means for starting and stopping said motor, said refrigerating system being characterized by means responsive to the accumulation of a predetermined thickness of ice on said evaporator for operating said switch, said last named means comprising a support, a first lever pivoted to said support, a second lever pivoted to said first lever, a reciprocating rod having one end thereof connected to said second lever, an ice probing lever pivotally mounted on said support and having one end connected to said second lever so as to be actuated thereby, cam means carried by said support and arranged to periodically actuate said second lever, means carried by said first lever for operating said switch, spring means arranged to normally hold said first lever stationary when said cam means actuates said second lever, said spring means being arranged to yield when said ice probing lever restricts movement of said second lever so as to cause said first lever to operate said switch to motor stopping position, and latch means for holding said switch in the motor stopping position after said cam means moves out of engagement with said second lever.

18. In a refrigerating system, an evaporator, a compressor, a condenser, refrigerant flow connections between said evaporator, compressor and condenser, and means responsive to a predetermined change in the amount of ice formed adjacent said evaporator for controlling the operation of said compressor, said last named means comprising an ice probing mechanism, a periodically operated cam for operating said mechanism, a control switch actuated by said mechanism into the compressor stopping position in response to operation of said probing mechanism after a predetermined accumulation of ice adjacent said evaporator, a latch for holding said switch in the motor stopping position, and means operable by said mechanism for releasing said latch in response to a subsequent operation of said mechanism after a reduction in the accumulation of ice.

19. In a unitized drink dispensing mechanism; a first unit comprising a cabinet having side, bottom and top walls, a water tank disposed within said cabinet, and refrigerating apparatus including an evaporator arranged in thermal exchange relationship with water in said tank; said cabinet having an opening in its top wall arranged in alignment with said water tank; a second self-contained unit comprising beverage storing and dispensing mechanism; and means for removably supporting said beverage storing and dispensing mechanism with a first portion of said mechanism projecting into said water tank and with a second portion of said dispensing mechanism projecting above the top wall of said cabinet; said second portion including a beverage dispensing nozzle.

References Cited in the file of this patent

UNITED STATES PATENTS

| Number | Name | Date |
|---|---|---|
| 2,009,817 | Rodman | July 30, 1935 |
| 2,123,073 | Bell | July 5, 1938 |
| 2,125,248 | Taylor | July 26, 1938 |
| 2,143,687 | Crayo | Jan. 10, 1939 |
| 2,209,461 | Kunkel | July 30, 1940 |
| 2,229,181 | Leilich | Jan. 21, 1941 |
| 2,231,653 | Baxter | Feb. 11, 1941 |
| 2,376,403 | Thompson et al. | May 22, 1945 |
| 2,403,470 | Tull | July 9, 1946 |
| 2,421,819 | Vanderberg | June 10, 1947 |
| 2,427,429 | Waite et al. | Sept. 16, 1947 |
| 2,433,977 | Bently | Jan. 6, 1948 |
| 2,462,019 | Bowman | Feb. 15, 1949 |
| 2,502,610 | Wegman | Apr. 4, 1950 |
| 2,565,084 | Parks | Aug. 21, 1951 |